United States Patent [19]

Fitzer et al.

[11] Patent Number: 4,737,224
[45] Date of Patent: Apr. 12, 1988

[54] PROCESS OF DRY ADHESIVE-FREE THERMAL TRANSFER OF INDICIA

[75] Inventors: Robert C. Fitzer; Frank L. Deyak; Charles J. Fabbrini, all of St. Paul, Minn.

[73] Assignee: Minnesota Mining and Manufacturing Company, St. Paul, Minn.

[21] Appl. No.: 816,756

[22] Filed: Jan. 7, 1986

Related U.S. Application Data

[63] Continuation of Ser. No. 296,491, Aug. 26, 1981, abandoned, which is a continuation of Ser. No. 163,643, Jun. 27, 1980, abandoned.

[51] Int. Cl.$^4$ .................... B44C 1/16; B32B 31/00
[52] U.S. Cl. .................... 156/240; 156/249; 156/286; 156/309.6; 428/200
[58] Field of Search ............ 156/230, 233, 234, 237, 156/239, 240, 241, 249, 289, 286, 285, 381, 382, 497, 538, 539, 540, 583.3, 309.6; 428/200, 202, 352, 914

[56] References Cited

U.S. PATENT DOCUMENTS

| | | | |
|---|---|---|---|
| 3,024,213 | 3/1962 | Ludlow | 106/316 |
| 3,361,281 | 1/1968 | Kehe . | |
| 3,813,270 | 5/1974 | Hix et al. | 156/382 |
| 3,818,823 | 6/1974 | Bond | 156/285 |
| 4,000,050 | 2/1977 | Hurst et al. | 156/240 |
| 4,028,166 | 6/1977 | Leanhart | 156/497 |
| 4,242,162 | 12/1980 | Ronning | 156/286 |
| 4,287,015 | 9/1981 | Danner, Jr. | 156/285 |
| 4,314,814 | 2/1982 | Deroode | 156/286 |
| 4,407,685 | 10/1983 | Hankland | 150/285 |

OTHER PUBLICATIONS

Theory and Practice of Vinyl Compounding, p. 42, ©1968 Argus Chemical, N.Y.

Primary Examiner—Donald E. Czaja
Assistant Examiner—Louis Falasco
Attorney, Agent, or Firm—Donald M. Sell; James A. Smith; James V. Lilly

[57] ABSTRACT

A process and composition are provided that provide for thermal transfer of ink compositions and eliminate the need to prepare articles such as sign faces, particularly flexible sign faces, by painting with ink compositions that contain solvents. The present process and composition permit thermal transfer from a carrier to a receptor at low temperatures with the use of vacuum pressure. The transferred ink adheres tenaciously to the receptor and is flexible.

22 Claims, No Drawings

PROCESS OF DRY ADHESIVE-FREE THERMAL TRANSFER OF INDICIA

This is a continuation of application Ser. No. 296,491 filed Aug. 26, 1981 which was a continuation of application Ser. No. 163,643 filed June 27, 1980 both now abandoned.

BACKGROUND OF THE INVENTION

This invention relates to thermally-transferable ink compositions, and processes for transferring a dry layer of a thermally-transferable ink composition from a carrier to a receptor. The present invention is particularly useful in manufacturing sign faces by transferring indicia from a carrier to a receptor in a completely dry process.

Past techniques for manufacturing sign faces have not proven entirely satisfactory. For example, these techniques have involved masking or outlining the surface of the sign face so as to provide a desired outline, followed by painting (e.g., by brushing or spraying) to obtain the desired colored design. Such techniques are time consuming, messy, and require that steps be taken to provide adequate ventilation for the hazardous solvents employed with the paints or inks. Moreover, steps must be taken to insure that the solvents used in the inks do not destroy the surface to which they are applied. Furthermore, such prior art techniques frequently require that various inks be mixed. This, of course, means that a color match must be made before the mixed ink can be utilized.

Processes for thermally transferring indicia from a carrier (e.g., release liner) to a receptor (e.g., a fabric such as cotton) and composition useful therewith are also known. See for example U.S. Pat. Nos. 3,361,281; 3,519,463; 3,684,545; 3,928,710; and 4,037,008. These processes and compositions generally require the use of high heat and pressure to effect transfer. Typically temperatures of 120° C. or more are required.

The use of the foregoing processes has not proven entirely satisfactory. For example, the temperatures employed require the use of large quantities of energy and limit the number of materials that can be utilized as receptors as the heat generated may degrade certain polymeric receptors. Still further, these prior art processes have not been found to provide strongly adhered images on uneven or textured and three dimensional substrates. Consequently, it is clear that a need exists for compositions, and processes for transferring thermally-transferable inks that overcome these disadvantages.

SUMMARY OF THE INVENTION

Provided herein are a novel process and composition that provides unique results. The process comprises a dry technique for transferring a thermally-transferable ink composition from a carrier to a receptor. This process eliminates the need to employ adhesives to bond the ink to the receptor. It also eliminates the need to go through the time consuming and potentially hazardous techniques described above. Furthermore, it eliminates the need for the sign fabricator to employ volatile solvents in sign preparation. Still further, the process provides the sign fabricator with almost unlimited versatility in the design of the artwork to be utilized on the sign face. Consequently, the fabricator can employ a wide variety of colors and decorative designs on the sign face.

The process of the invention comprises the steps of
(a) providing a carrier bearing a thermally-transferable ink composition;
(b) applying said ink to a receptor surface;
(c) adjusting said receptor surface so that it is free from wrinkles;
(d) evacuating substantially all of the air from the interface between said ink and said receptor surface;
(e) heating said ink and said receptor surface to a temperature, and for a time, sufficient to soften said ink and intimately bond it to said receptor, said heating occurring after substantially all of said air has been evacuated from said interface.

The novel composition provided herein is particularly preferred for use with the above-described process. It comprises a thermally-transferable ink composition having a 20% elongation temperature of less than 85° C. and an elongation at break of at least about 15%. The ink is made up of
(a) from about 50 to 95% by weight of a thermoplastic polymer selected from the group consisting of polyvinyl chloride and copolymers thereof;
(b) from about 50 to 5% by weight of a flexibilizer for said thermoplastic polymer that is compatible with said thermoplastic polymer; and
(c) up to about 40% by weight of a colorant.

Sign faces made by utilizing the novel process and composition described herein offer several advantages. For example, the ink compositions conform virtually exactly to the surface of the receptor. Thus, the ink can be applied to textured substrates and be totally adhered thereto.

Still further, the inks of the invention can be utilized to fill-in openings left for indicia in a previously applied layer. The ink conforms exactly to the surface and completely fills in the opening and becomes totally adhered to the receptor. This is particularly useful in providing indicia of one color on a differently colored background.

The conformability of the inks of the invention is of particular significance in the preparation of large are flexible sign faces. These sign faces typically require that two or more sheets of the receptor be joined or seamed together. Each juncture or seam is thicker than an individual sheet of the receptor so that a mound or ridge is formed. The inks of the invention conform and adhere to both the seam and the balance of the receptor tenaciously.

This excellent adhesion and conformability is surprising, particularly with respect to the most preferred aspects of the invention, since low transfer temperatures are employed during the process. Furthermore, ink transferred in accordance with the present invention exhibit excellent flexural characteristics. Thus, when a completed pliant sign face is flexed, the ink does not crack or peel off. Moreover, when completed rigid sign faces expand and contract due to temperature changes, the ink does not rack or peel off.

Still further, the ink compositions of the invention exhibit excellent weatherability. For example, they do not show any significant fading or darkening when exposed to outdoor conditions. Moreover, they do not chip, peel, crack, etc. under these conditions.

The adhesion of the transferred ink to the receptor is demonstrated by the tape adhesion test described in ASTM D 3359-74, method B with the modification that the receptor is 0.5 mm thick.

In the tape adhesion test, a lattice cut is made so as to provide intersecting cut lines through the ink layer and into the receptor. Pressure sensitive tape is applied over the lattice and then stripped away. The ink compositions of the invention exhibit a classification number of at least 4, and preferably 5. A classification number of 4 means that virtually none of the transferred ink is removed while a classification number of 5 means that none of the transferred ink is removed.

DETAILED DESCRIPTION OF THE INVENTION

In the process of the present invention, a thermally-transferable ink is transferred from a carrier to a receptor at a temperature sufficient to soften the ink and intimately bond it to the receptor. While any temperature sufficient to achieve this result may be utilized, the temperature is preferably in the range of 75° C.-110° C., and most preferably in the range of 85° C.-95° C.

The essential steps of the process of the invention are set forth above. Thus, a carrier bearing a dry layer of thermally-transferable ink (hereinafter referred to as the "transfer sheet") is placed on a desired receptor so that the ink contacts the receptor surface. Carriers and techniques for applying the ink thereto will be described hereinafter.

While it is not necessary to the process, it is frequently desirable to provide an image of the desired art work on the receptor prior to placing the transfer sheet on the receptor. A variety of techniques may be employed to do this. In one useful technique a reduced-size black and white photocopy of the sign face to be prepared is made. The photocopy is then utilized to make a projection transparency, which is then projected onto the desired receptor surface. The size of projected image can be readily adjusted so as to obtain the desired size of sign by techniques known to the art.

The transfer sheet may be fastened to the receptor by a variety of techniques. However, simply taping the transfer sheet is sufficient. If, it is desired to provide a differently colored background, that is a color that is different than the color of the receptor, a transfer sheet of one color may be fastened to the portion of the receptor surface desired to be differently colored followed by removing (e.g., by cutting out) the image areas from the transfer sheet. A second transfer sheet, having the color desired for the art work may then be fastened over the cut-out areas of the first transfer sheet.

Once the appropriately colored transfer sheets have been fastened to the receptor, the resulting intermediate structure is placed in a device, such as a vacuum frame, and adjusted so as to provide a wrinkle free surface. If necessary, this may be accomplished by placing the intermediate structure under tension.

A particulary advantageous technique for providing a wrinkle-free surface is to turn on the vacuum pump of the vacuum frame with the intermediate on the vacuum bed thereof and with the top thereof up. If the intermediate does not cover the entire vacuum bed, sheets of substantially non-porous material may be placed over the uncovered portions. Wrinkles in the intermediate may then be squeezed out or otherwise removed. The non-porous sheets may then be removed (leaving the wrinkle-free intermediate) and the top lowered.

Typically the intermediate is placed in the vacuum frame so that the receptor contacts the vacuum bed and the transfer sheeting contacts the top when the top is closed. The exact vacuum frame utilized in the process of the invention is not critical to the invention as a variety of commercially available vacuum frames are useful.

Preferably the vacuum bed of the frame has a smooth surface free from ridges, lumps, etc., especially where the perforated vacuum bed meets the outer supports of the vacuum frame. Additionally, the vacuum bed is preferably covered with a porous material such as muslin.

The top of the vacuum frame contains an air bladder and, above the bladder, a lamp bank. The top is preferably hinged on one end and has locks on the other end. The hinges and locks are located so that a wide sheet of receptor can pass therebetween. A porous fabric, such as muslin, is preferably fastened to the surface of the bladder that contacts the transfer sheet. The lamp bank preferably comprises a plurality of lamps that, preferably, emit radiation in the infra red range. A temperature controller is also preferably included so as to regulate the heat input into the vacuum frame.

Once the wrinkles have been removed from the intermediate, the vacuum frame is closed and a vacuum created therein to evacuate substantially all of the air from the interface between the ink and the receptor and provide intimate contact between the receptor and the ink. It has been found that this may be accomplished by reducing the pressure in the frame to between about 0.1 to 0.25 atmosphere for from 2 to 5 minutes. Preferably the pressure is reduced to at least about 0.2 atmosphere.

The receptor surface and the ink are then heated to the predetermined transfer temperature. Heating may be accomplished by a variety of techniques, although it has been found that a bank of 300 watt incandescent light bulbs that emit radiation in the infrared range is satisfactory. The intermediate, particularly receptor surface and ink, is heated to a temperature sufficient to soften the ink and intimately bond it to the receptor. The exact temperature is dependant upon the nature of the ink and the receptor employed. The temperature must, however, be below that at which the ink and receptor degrade.

During heating, the ink and receptor surface fused together and form an intimate bond. Preferably heating is carried on only for a time sufficient to accomplish this result. It has been found that, with the compositions of the invention, heating need only be at a temperature between about 75° to 110° C for from 2 to 10 minutes.

Evacuating substantially all of the air from the interface between the receptor surface and the ink causes a pressure differential between the interface and the exterior of the intermediate structure. The lack of air at the interface in combination with the pressure differential makes it possible to achieve the tenacious and intimate bonding of the ink to the receptor at low temperatures. Preferably the pressure differential is at least about 0.75 atmosphere.

The vacuum is then released and the receptor and ink are cooled. This may be done by passive means or by active means, for example by blowing air over the intermediate. Once the intermediate has cooled to a temperature (e.g., a temperature of 65° C. or less) sufficient to harden the ink and cause the adhesion of the ink to the receptor to be greater than the adhesion of the ink to the carrier, the carrier is stripped from the receptor. The resultant receptor then bears indicia that are firmly anchored thereto and that conform exactly to the surface thereof.

In the event that the receptor is too large to fit entirely within the vacuum frame at one time, the above described process may be repeated in a step-wise manner until the entire sign face has been completed. During a step-wise process it is preferred that indicia (e.g., letters, numbers, etc.) to be transferred be located entirely within the frame during heating.

A wide variety of receptors may be utilized in the process of the invention. They may be polymeric or non-polymeric, flexible or rigid, and thick or thin. Moreover, the surface of the receptor may be smooth or irregular.

Receptors useful with the present invention include a variety of polymeric films including polyvinylchloride (e.g., Panaflex ® film from National Advertising Company and Scotchal ® film from 3M Company), acrylic films (e.g., Plexiglass ® from Rohm and Haas), cellulose acetate butyrate film, and urethane films. Other resin films may also be employed as receptor materials. The receptor materials may be used as such or they may have their surface modified by, for example, priming, corona treatment, solvent wiping, etc.

The novel compositions described herein comprise a defined thermoplastic resin, a flexibilizer for said resin, and, optionally, a colorant, an ultraviolet light absorber, a heat stabilizer, a surfactant, a flow aid, etc. They have a 20% elongation temperature of no more than about 85° C. and preferably one in the range of 70° C. to 85° C. Additionally, they have an elongation at break of at least 15%.

The 20% elongation temperature is determined in the same manner as the ring and ball softening point described in ASTM E-2842-T except that the film thickness is 25 microns, the ball weight is 1.5 g, the ring width is 14 cm, and heating is done in air and commences at 60° C. and is raised at a uniform rate of 1.7° C. per minute. The 20% elongation temperature is that temperature at which a film of the resin has elongated 120% of its original dimension.

Elongation at break is measured according to ASTM D412-75, Method A, section 12.2. Test samples are 1.25 cm wide with a spacing of 1.25 cm. Pulling speed is 10 cm per minute. The measurement of elongation at break is set forth at section 5.2 of the test method.

The ink compositions may be readily prepared by, for example, dissolving the thermoplastic resin and flexibilizer together in a suitable screen-printing solvent, such as isophorone or cyclohexanone, followed by addition of the colorant and other ingredients. The colorant may be added directly if a dye is used. If a pigment is used, it is first preferably dispersed in a solvent, resin, or plasticizer that is compatible with the solvent used to dissolve the thermoplastic resin. Known processing techniques may be employed in preparing the compositions.

The thermoplastic resins useful in the novel compositions comprise from about 50% to 95% by dry weight of the composition, and preferably from about 65% to 95% by dry weight. They are selected from polyvinyl chloride and copolymers thereof. Specific examples include, for example, polyvinyl chloride, polyvinyl chloride-polyvinyl acetate copolymers (e.g., Bakelite ® VYHH available from Union Carbide Company).

The flexibilizer employed in the novel compositions comprises from about 50 to 5% by dry weight of the composition, and preferably from about 20 to 5%. It flexibilizes the composition and is compatible with the vinyl polymer or copolymer. Moreover, it imparts conformability and elasticity to the ink composition, and improves its film strength by improving the elongation characteristics of films of the ink.

Re=presentative classes of useful flexibilizers are selected from the group consisting of synthetic resins that are free from vinyl chloride units and that have a 20% elongation temperature of less than about 85° C., and plasticizers for polyvinyl chloride.

Specific examples of useful vinyl chloride-free resins include ethyl, methyl, and butyl methacrylate homopolymers, and copolymers of said homopolymers with methyl, ethyl, and butyl acrylate. Such resins are available from Rohm and Haas as the Acryloid ® series and from DuPont as the Lucite ® series.

Other useful vinyl-chloride-free resins are urethane polymers such as polyester-functional aromatic urethanes (e.g., the Estane ® series from B. F. Goodrich), and polyester and polyether-functional aliphatic urethanes (e.g., respectively QI-12 and PE-192 from Quin).

Other useful thermoplastic resins include linear polyester resins (e.g., Vitel ® PE-222 from Goodyear), acrylonitrile-butadiene-styrene resins (e.g., Cycolac ® WA 2021 from Borg-Warner), polycaprolactam polymers (e.g., PCL-700 Union Carbide, sucrose acetate isobutyrate, available as SAIB from Eastman Chemical, ethylene vinyl acetate resin, ethyl methacrylate, and butyl methacrylate resin. Combinations of vinyl chloride-free thermoplastic resins may be utilized if desired.

Specific examples of classes of plasticizers useful in the compositions of the invention are alcohol phthalates (e.g., Santicizer ® 711, a mixture of alcohol phthalates containing from 7 to 11 carbons in the phthalate chain from Monsanto); polymeric polyesters (e.g., Santicizer ® 429, available from Monsanto); aromatic phthalates (e.g., Santicizer ® 160, butyl benzyl phthalate from Monsanto) and mixed lower alkyl benzyl phthalates (Santicizer ® 261 from Monsanto); epoxidized vegetable oils (e.g., epoxidized linseed oil, epoxidized soybean oil, epoxidized safflower oil); and phosphoric acid derivatives (e.g., Santicizer ® 141, 2-ethylhexyl-diphenyl phosphate from Monsanto), and tricresyl phosphate from Monsanto.

Blends of flexibilizers e.g., combinations of one or more resins with one or more plasticizers, may be employed if desired.

Colorants useful in the compositions of the invention comprise up to about 40% by dry weight of the composition. Preferably they comprise from about 1% to 30%. Quantities of from about 1% to 15% are useful in providing light and pastel shades while quantities of from about 15% to 30% are useful in providing dark colors. The colorants may be selected from dyes or pigments, although pigments are preferred.

Examples of useful pigments include
Molybdate Orange
Primrose Yellow
Quinacridone Red
Phthalocyanine Blue
Carbon Black
Phthalocyanine Green
Rutile Titanium Dioxide
Carbazole Violet
Chrome Yellow
Irgasine Yellow
Lead Chromate Yellow
Quinacridone Pink The pigments may be provided in dry bulk form, or as a dispersion in a solvent, liquid or solid resin, plasticizer, or combinations thereof.

A variety of other ingredients may be utilized in the compositions of the invention. Thus, for example, ultraviolet light absorbers, heat stabilizers, surfactants to aid application of the composition to a carrier, and solvents may be employed. Examples of materials useful for these purposes are known as will be understood as a result of this disclosure.

As discussed above, the compositions useful in the present invention are prepared by dissolving the ingredients together in an appropriate solvent. The solution is then filtered and coated onto a suitable carrier. Coating is preferably carried out by screen printing. Other coating techniques, such as reverse roll, knife, and rotogravure, may be utilized if desired. The solvent is removed from the coated layer by, for example, impinging the coating with air at about 80° C.

The thickness of the dry layer of thermally-transferable ink is not critical to the invention. However, it has been found that good results, in terms of transferred indicia quality, may be obtained if the layer has a thickness in the range of 5 to 50 microns. Preferably the thickness is in the range of 8 to 25 microns. Most preferably the thickness is about 25 microns.

The carrier utilized in the transfer sheet may be any material that is dimensionally stable and exhibits high release characteristics. Thus, the carrier must release from the thermally-transferable ink once it has been adhered to a receptor. The carrier usually is coated or impregnated with a suitable release material so as to facilitate this release. The carrier preferably is flexible and exhibits good hand, that is, it may be cut easily by die cutting or hand cutting techniques.

Sheeting materials that have suitable release characteristics are known. They include Warren O-Duplex, available from S. D. Warren Paper Co.; Trans-Eze® 2000 and 3000, and Kimdura, all available from Kimberly-Clark; polyethylene sheeting, and polypropylene sheeting. Silicone or other treated paper may also be employed.

The thermally-transferable ink may occur on the carrier in a variety of ways, including, for example, as a continuous layer of the ink or as one or more discrete indicium. The former type of transfer sheet may be used to provide large background areas or individually prepared indicium on sign faces. The latter type of transfer sheet may be used in applying pre-prepared indicium to a receptor.

In the process of transferring thermally-transferable ink, especially to form sign faces, described herein it is preferable, though not necessary, to apply a clear (i.e., colorless and transparent) layer over the indicium-bearing surface. The clear layer is most preferably thin (i.e., approximately 25 microns) and clear layer acts as a barrier to the loss of flexibilizer (especially plasticizer). Additionally, it reduces the ability of nutrients to come to the surface thereby reducing the growth of fungus. Still further, it serves as a moisture barrier. Furthermore, it can contain other additives such as ultraviolet light absorbers, antioxidants, fungistats, and so forth.

The clear coat may be applied by the same techniques used to transfer the ink from the carrier to the receptor. Like the ink, the clear coat is preferably provided on a material that exhibits high release characteristics. Common processing techniques can be utilized to apply the clear coat to a release material.

A useful clear coat comprises at least 95% by weight of acrylic polymers such as polymethyl methacrylate, and copolymers of methyl methacrylate with ethyl and butyl methacrylate. The remaining 5% by weight is made up of other additives such as those mentioned above. Examples of these materials include the 3900 and 4000 series of Scotchcal® resins available from 3M Company.

Known thermoplastic compositions may also be employed to provide the thermally-transferable ink in the process of the present invention. However, these materials must be combined with a flexibilizer if they are to have a combination of a 20% elongation temperature less than about 85° C. and an elongation at break of at least 15%. Examples of such commercially available formulations include the 600 Series inks from General Formulations (a division of General Research Incorporated), the G.V. series inks from Naz Dar, the 9600 series inks from Colonial Inks, the "Lov" series from Advance Screen Printing Co., and the 8000 series vinyls from Tibbetts & Westerfield.

The present invention is further described in the following examples wherein all percentages are by weight unless otherwise indicated.

EXAMPLE 1

Thermally transferable ink formulations were prepared from the following ingredients using the quantities indicated.

|  | % |
| --- | --- |
| Polyvinyl Chloride-Polyvinyl Acetate Copolymer (Bakelite ® VYHH from Union Carbide, 86% vinyl chloride and 14% vinyl acetate) | 18 |
| Polymethyl Methacrylate-Ethyl Methacrylate Copolymer (Acryloid ® B82 from Rohm and Haas) | 4 |
| Aliphatic Urethane (QI 12 from K. J. Quin)* | 4 |
| Butyl Benzyl Phthalate (Santicizer ® 160 from Monsanto) | 7 |
| Mixed Alkyl Benzyl Phthalate (Santicizer ® 261 from Monsanto) | 7 |
| Quinacridone Red | 10 |
| 2,2-dihydroxy-4,4-dimethoxy benzophenone | 0.1 |
| Ba & Cd Stearate | 0.25 |
| Epoxidized Linseed Oil | 0.5 |
| Isophorone | 25.1 |
| Butyl Cellosolve | 7.75 |
| Mixed aromatic solvents (SC solvent 150 from Central Solvents and Chemicals) | 5.1 |
| Diacetone Alcohol | 7.1 |
| Cyclohexanone | 4.1 |

*Provided in solution, solvent evaporated and dry urethane added.

The ink solution was prepared by mixing all ingredients together until they had dissolved and the pigment had dispersed. The pigment wast provided in a dispersion in cyclohexanone before addition.

The solution was then applied to the release surface of a carrier of Trans-Eze® 2000 and dried at 60? C. to remove the solvent. The thickness of the dried layer was 25 microns. The ink composition hasd a 20% elongation temperature of 82° C. and an elongation at break of 110%.

The resulting dry transfer sheet was applied to the surface of a polyvinyl chloride sheet that was reinforced with thermoplastic fibers so that the thermally-transferable ink contacted the polyvinyl chloride sheet. The surface of the polyvinyl chloride sheet was three-dimensional. The resulting intermediate structure was placed in a vacuum frame and adjusted to remove all wrinkles. The frame was then closed and the pressure therein reduced to 0.2 atmosphere after which the temperature therein was raised to 88° C. This pressure and temperature were maintained for 2 minutes. The pressure was then increased to atmospheric pressure and the temperature in the vacuum frame was lowered to 50° C. The carrier was then stripped-from the receptor. The ink transferred completely from the carrier to the receptor. The carrier left no residue on the indicia. When the tape adhesion test was performed on the transferred ink, a classification number of 5 was obtained (i.e., no ink was removed from the receptor).

EXAMPLES 2-5

Thermally-transferable ink formulations were prepared and coated onto Trans-Eze ® 2000 carrier as described in Example 1 from the following formulations. All quantities are in %.

|  | 2 | 3 | 4 | 5 |
|---|---|---|---|---|
| Bakelite ® VYHH | 18 | 18 | 25 | 25 |
| Acryloid ® B82 | 4 | 4 | — | — |
| Sucrose Acetate Isobutyrate | 4 | 4 | — | — |
| Santicizer ® 711 (mixture of alcohol phthalates from Monsanto) | 7 | 7 | — | 6.25 |
| Santicizer ® 261 (Aromatic Phthalate Plasticizer from Monsanto) | 7 | 7 | — | — |
| Phthalocyanine Blue | 8 | — | — | — |
| Rutile Titanium Dioxide | 0.5 | — | — | — |
| Carbazole Violet | 1.5 | — | — | — |
| Quinacridone Red | — | 8 | — | — |
| Molybdate Orange | — | 2 | — | — |
| 2,2-dihydroxy-4,4-dimethoxy-benzophenone | 0.4 | 0.4 | — | — |
| Ba & Cd Stearate | 0.5 | 0.5 | — | — |
| Epoxidized Soy Bean Oil | 1 | 1 | — | — |
| Dimethoxy Silicone (SF-96 from General Electric) | 0.1 | 0.1 | — | — |
| Isophorone | 30 | 30 | — | — |
| Butyl Cellosolve | 8 | 8 | — | — |
| Mixed aromatic solvents (SC solvent from Central Solvents and Chemicals) | 10 | 10 | — | — |
| Cyclohexanone | — | — | 75 | 68.75 |

The ink compositions had respective 20% elongation temperaturs of 71° C., 71° C., 85° C., and 84° C. and elongations at break of 130%, 130%, 0% and 95%.

The ink compositions of the resulting transfer sheets were transferred to a Panaflex ® receptor as described in Example 1 at various temperatures. The pressure was 0.2 atmosphre. It was found that a temperature of only 82° C. was sufficient to transfer the ink composition of Example 2. A classification number of 5 was obtained in the tape adhesion test. The ink compositions of Examples 3-5 demonstrated the classification number when transferred at a temperature of about 88° C.

When the composition of Example 4 was transferred as described above to a seam, it was found that the tape adhesion classification number was less than 4 for that portion of the ink on the seam. This demonstrates that while many ink compositions may be transferred according to the process of the invention, those of the invention provide superior results.

We claim:

1. A dry, adhesive-free process for transferring a dry thermally-transferable ink composition from a carrier to a receptor comprising the steps of:
   (a) providing a receptor and a carrier bearing a dry thermally-transferable ink composition and a vacuum frame having a vacuum bed, a top capable of covering the vacuum bed, a porous material on said top for contacting said carrier, and a source of heat above said porous material;
   (b) placing said receptor and said carrier on said vacuum bed so that said ink composition contact said receptor to form an interface therebetween;
   (c) adjusting said interface so that it is free from any wrinkles and closing said top so as to form a chamber;
   (d) evacuating substantially all of the air from said interface by means of vacuum to create a reduced pressure in said chamber and coform said ink composition to said ink composition to said receptor;
   (e) mantaining said reduced pressure and heating said ink composition and said receptor to a temperature, and for a time, sufficient to soften said ink composition, fuse said ink composition to said receptor and form an intimate bond thereto and transfer said ink from said carrier to said receptor; and
   (f) removing said carrier from said ink, thereby leaving said ink adhered to said receptor surface.

2. A process according to claim 1 comprising the further step of cooling said ink and said receptor to a temperature sufficient to harden said ink and cause the adhesion of said ink to said receptor to be greater than the adhesion of said ink to said carrier.

3. A process according to claim 2 wherein said ink and said receptor are cooled to a temperature of less than about 65° C.

4. A process according to claim 1 wherein heating is carried on at a temperature in the range of about 75° C. to 110° C.

5. A process according to claim 4 wherein heating is carried on for from about 2 to 5 minutes.

6. A process according to claim 1 wherein said reduced pressure in said chamber is at most about 0.75 atmosphere.

7. A process of manufacturing a sign face having a thermally-transferable ink composition applied to at least a portion of a receptor in a dry, adhesive-free manner, said process comprising the steps of:
   (a) providing a receptor and a carrier bearing a layer of a dry thermally-transferable ink composition and a vacuum frame having a vacuum bed, a top capable of covering the vacuum bed, a porous material on said top for contacting said carrier, and a source of heat above said porous material;
   (b) placing said receptor and said carrier on said vacuum bed so that said ink composition contacts said receptor to form an interface therebetween;
   (c) adjusting said interface so that it is free from any wrinkles and closing said top so as to form a chamber;
   (d) evacuating substantially all of the air from said interface by means of vacuum to create a reduced pressure in said chamber and conform said ink composition to said receptor;
   (e) maintaining said reduced pressure and heating said ink composition and said receptor surface to a temperature, and maintaining said temperature for a time, sufficient to soften said ink composition, fuse said ink composition to said receptor surface and form an intimate bond thereto and transfer said ink composition to said receptor surface;
   (f) cooling said ink composition and said receptor surface to a temperature sufficient to harden said ink composition and cause the adhesion of said ink composition to said receptor surface to be greater than the adhesion of said ink composition to said carrier; and (g) removing said carrier from said ink thereby leaving said ink adhered to said receptor surface.

8. A process according to claim 7 wherein said receptor is polymeric.

9. A process according to claim 8 wherein said receptor is rigid.

10. A process according to claim 8 wherein said receptor is flexible.

11. A process according to claim 8 wherein said receptor comprises polyvinyl chloride sheeting.

12. A process according to claim 11 wherein said receptor is fiber reinforced.

13. A process according to claim 12 wherein said fiber is thermoplastic.

14. A process according to claim 13 wherein said receptor has a three dimensional surface.

15. A process according to claim 7 wherein said receptor has a smooth surface.

16. A process according to claim 7 wherein said receptor has a three dimensional surface.

17. A process according to claim 1 wherein said thermally-transferable ink composition comprises (a) from about 50 to 95% by weight of a thermoplastic polymer selected from the group consisting of polyvinyl chloride and copolymers thereof;

(b) from about 50 to 5% by weight of a flexibilizer for said thermoplastic polymer that is compatible with said thermoplastic polymer; and (c) up to about 40% by weight of a colorant; wherein said composition has a 20% elongation temperature of less than 85° C. and an elongation at break of at least about 15%.

18. A process according to claim 17 wherein said thermoplastic polymer is selected from the group consisting of polyvinyl chloride and polyvinyl chloride-polyvinyl acetate copolymers.

19. A process according to claim 17 wherein said flexiblilizer is selected from the group consisting of synthetic resins free from vinyl chloride units having a 20% elongation temperature of less than about 85° C., and plasticizers for polyvinyl chloride.

20. A process according to claim 19 wherein said flexibilizer is selected from the group consisting of ethyl, methyl, and butyl methacrylate homopolymers, and copolymers of said homopolymers with methyl, ethyl, and butyl acrylate, polyester-functional aromatic urethanes, polyester and polyether-functional aliphatic urethanes, linear polyester resins, acrylonitrile-butadine-styrene resins, polycaprolactam polymers, sucrose acetate isobutyrate, ethylene vinyl acetate resin, ethyl methacrylate, butyl methacrylate, alcohol phthalates, polymeric polyesters, aromatic phthalates, mixed lower alkyl benzyl phthalates, epoxidized vegtable oils, phosphoric acid derivatives, and tricresyl phosphate.

21. A process according to claim 17 wherein said colorant is a pigment.

22. A process according to claim 7 or 17 wherein said heating is carried out at a temperature in the range of about 75° C. to 110° C.

* * * * *

UNITED STATES PATENT AND TRADEMARK OFFICE
CERTIFICATE OF CORRECTION

PATENT NO. : 4,737,224
DATED : April 12, 1988
INVENTOR(S) : Fabbrini

It is certified that error appears in the above-identified patent and that said Letters Patent is hereby corrected as shown below:

On the title page Item (19), "Fitzer et al" should read -- Fabbrini --.

On the title page Item (75), Inventor should read -- Charles J. Fabbrini, of St. Paul, Minn.--.

Column 2, line 59, "rack" should read --crack--.

Column 3, line 19, "95°" in bold print, should not be in bold print.

Column 3, line 55 "particulary" should read --particularly--.

Column 4, line 47 "110°C" should read --110°C.--.

Column 6, line 4, "Re=presentative" should read --Representative--.

Column 8, line 54, "wast" should read --was--.

Column 8, line 57, "60?C. should read -- 60°C.--.

UNITED STATES PATENT AND TRADEMARK OFFICE
CERTIFICATE OF CORRECTION

PATENT NO. : 4,737,224
DATED : April 12, 1988
INVENTOR(S) : Fabbrini

It is certified that error appears in the above-identified patent and that said Letters Patent is hereby corrected as shown below:

Column 8, line 59, "hasd" should read -- had --.

Column 9, line 7, "stripped-from" should read --stripped from--.

Column 9, line 50, "atmosphre" should read --atmosphere--.

Signed and Sealed this

Eleventh Day of October, 1988

Attest:

DONALD J. QUIGG

Attesting Officer

Commissioner of Patents and Trademarks